| United States Patent [19] | [11] | 4,281,254 |
|---|---|---|
| Seachman | [45] | Jul. 28, 1981 |

[54] SELF SCANNED PHOTOSENSITIVE ARRAY

[75] Inventor: Ned J. Seachman, Penfield, N.Y.

[73] Assignee: Xerox Corporation, Stamford, Conn.

[21] Appl. No.: 54,354

[22] Filed: Jul. 2, 1979

[51] Int. Cl.$^3$ .............................................. H01J 40/14
[52] U.S. Cl. ................................. 250/578; 307/221 D
[58] Field of Search ............................ 250/211 J, 578; 307/221 D; 358/212, 213; 357/24

[56] References Cited

U.S. PATENT DOCUMENTS

| 3,683,193 | 8/1972 | Weimer . | |
|---|---|---|---|
| 3,715,485 | 2/1973 | Weimer . | |
| 3,814,846 | 6/1974 | Snow . | |
| 3,822,362 | 7/1974 | Weckler et al. . | |
| 3,876,989 | 4/1975 | Bankowski et al. . | |
| 3,987,292 | 10/1976 | Means .................................. | 357/24 |
| 4,084,107 | 4/1978 | Ohba et al. ...................... | 307/221 D |
| 4,145,721 | 3/1979 | Beaudouin et al. .................. | 250/578 |

Primary Examiner—David C. Nelms

[57] ABSTRACT

A photosensor array with single transfer register (36) and individual transfer gates (38) for conducting signal packets derived from the photosensors (12) of the array to the transfer register phase gates. The number of phase gates of the transfer register is equal to the number of photosensors that comprise the array, and to assure at least two phase gates for each photosensor signal packet, a ring counter (40) is provided to sequentially trigger each transfer switch, operation of the ring counter being integrated with shift register clock drive pulses ($\phi 1$, $\phi 2$) to shift the signals transferred to the shift register and assure the required plural phase gates at the instant of transfer. The aforedescribed array permits multiple arrays to be constructed on a common substrate with the array photosensors in face-to-face relationship.

12 Claims, 7 Drawing Figures

SELF SCANNED PHOTOSENSITIVE ARRAY

The invention relates to an improved self scanned photosensitive array, and more particularly to an apparatus and method for sequentially transferring signals internally of the array to provide an array with reduced complexity.

Present linear self scanned photosensor arrays as for example, charge coupled devices or CCDs, require for serial video readout, serial shift registers on both sides of the central array of photosensors. This limitation results from attempts to achieve the highest possible array density and minimum size of photosites and shift register gates. Because of this, gates and photosites are nearly equal in size. Since two or more separate shift register gates or phases are required for each analog signal packet to accommodate the output of each photosensor, two-sided transfer has been adopted to achieve the aforementioned high density.

Photosensor arrays of the type described, since they require two serial shift registers, have increased fabrication complexity. Additionally, because there may be small differences between the two CCD shift registers, there often results an imbalance between the output signals of one register relative to the other which may be difficult to eliminate.

As a further embodiment, and in an effort to further increase array density, some array designs utilize two shift registers on each side of the array of photosensors for a total of four registers. While this construction increases array density, it also at the same time increases array fabrication complexity and requires a more complex multiplexing arrangement for handling the output signals produced by the array.

This invention relates to an improved self scanned photosensitive array comprising: a plurality of photosensors in sequence; a shift register having a plurality of phase gates for receiving signals from the photosensors individually; a plurality of switches for coupling the photosensors with individual ones of the shift register phase gates to enable signals from the photosensors to be transferred to the shift register phase gates; counter means for triggering the switches in a sequence corresponding to the photosensor sequence; and clock means for indexing the shift register to shift signals serially along the shift register from one phase gate to the next, the clock means having a frequency relative to that of the counter means to provide a number of adjoining shift register phase gates equal to the number of phases in the clock means for each photosensor signal.

This invention further relates to a method of operating a self-scanned photosensitive array having plural photosensors, a multiple gate shift register for receiving signals produced by the photosensors, and a transfer switch array for coupling the photosensors to the shift register gates, the steps comprising: (a) sensing and integrating a sequence of signals in the photosensor array proportional to the irradiance patterns incident on the array; (b) sending a trigger pulse to each of the transfer switches in succession to transfer signals from the photosensors to the shift register gates; (c) clocking alternate odd and even shift register gates between the transfer gate trigger pulses to step signals linearly along the shift register through the shift register gates to maintain the required spacing of analog signals as the signals progress towards the shift register output; (d) terminating step b on triggering of the last one of the transfer switches; (e) terminating step c when the last signal in the shift register is output from the shift register; and (f) repeating steps a through e for each successive line sensed.

Figure 1:
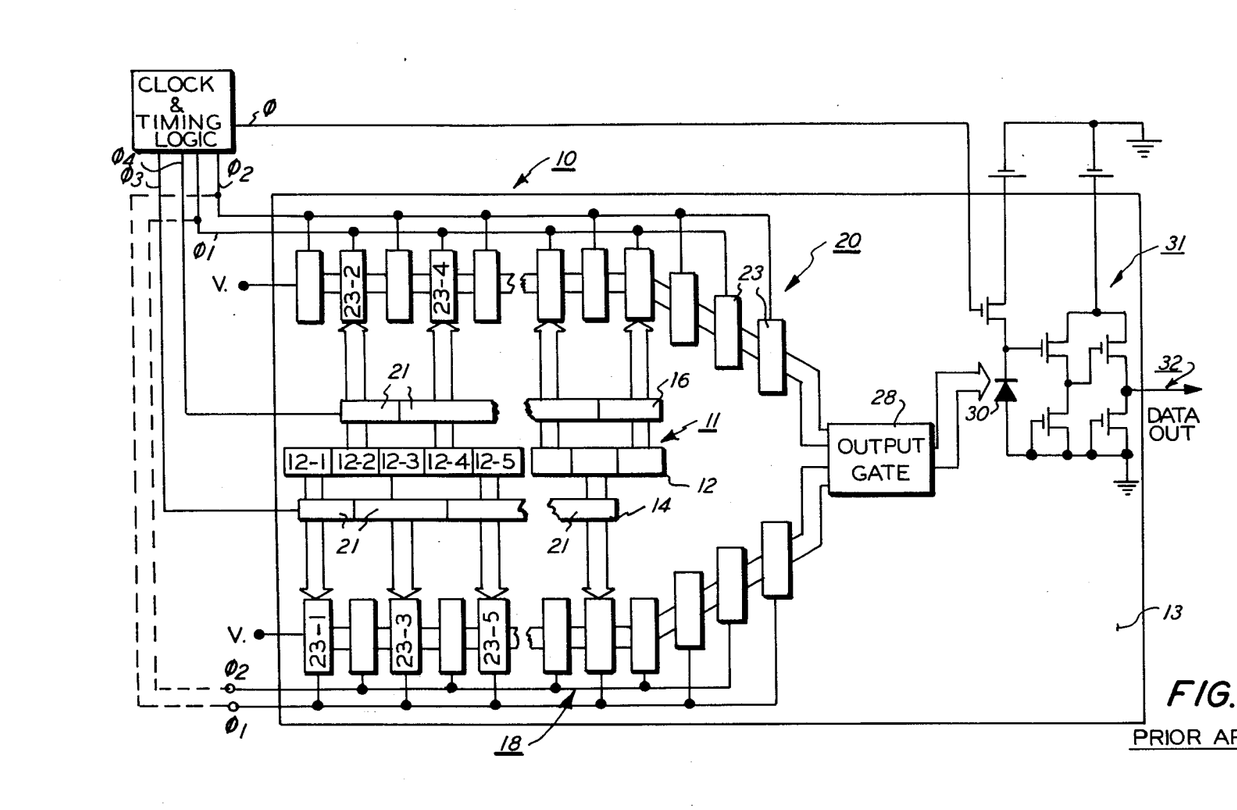
FIG. 1 is a schematic view of a conventional self-scanned photosensor array.
Figure 2:
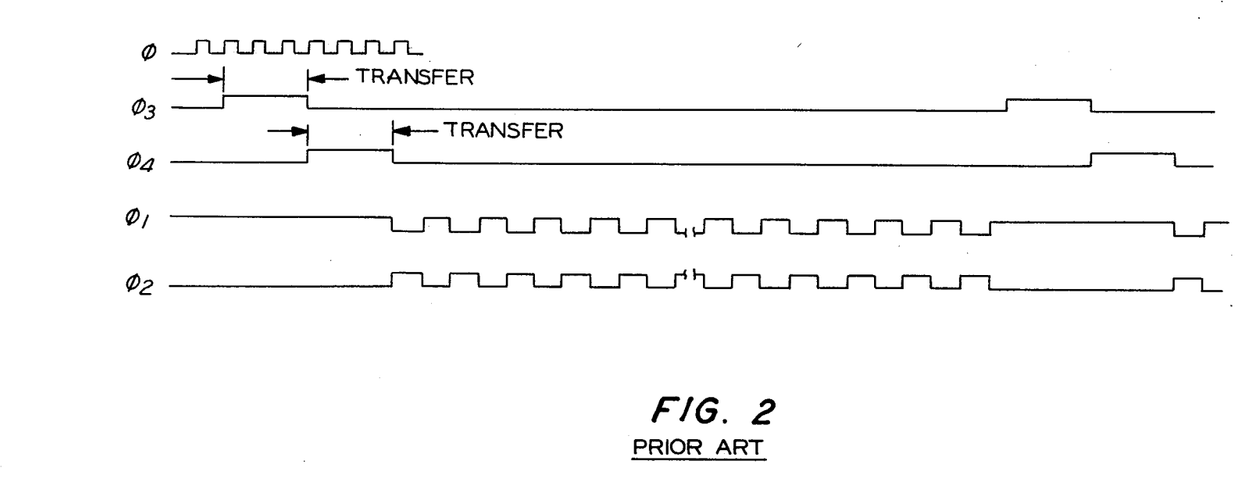
FIG. 2 is a timing diagram illustrating the operational sequence of the array shown in FIG. 1.

Referring to FIGS. 1 and 2, a typical self scanned photosensitive array, herein a CCD, is thereshown. Array 10 includes a succession or array 11 of photosensors 12 on the narrow center portion of a silicon chip 13. Array 11 is flanked on either side by rows 14,16 of transfer gates 21. Shift registers 18,20 which comprise parallel in serial out analog registers are disposed on either side of the rows 14,16 of transfer gates.

Transfer gates 21 couple photosensors 12 to individual phase gates 23 of shift registers 18,20. To provide at least two shift register phase gates for each photosensor, the total number of phase gates 23 in each shift register 18,20 is at least equal to the number of photosensors 12 that comprise array 11. In the arrangement shown, phase gates 23-1, 23-3, 23-5, of shift register 18 are coupled to the odd numbered photosensors 12-1, 12-3, 12-5, etc. while phase gates 23-2, 23-4, etc. of shift register 20 are coupled to the even numbered photosensors 12-2, 12-4, etc.

In operation, exposure is taken over a preset integration interval following which the signal packets from the odd numbered photosensor cells are transferred in parallel to shift register 18 on clock enabling pulse $\phi 3$ and the signal packets from the even numbered photosensor cells are transferred in parallel to shift register 20 on clock enabling pulse $\phi 4$. Clock pulses $\phi$, $\phi 1$, $\phi 2$, $\phi 3$, $\phi 4$ are derived from a suitable clock source 15.

Following transfer of the signal packets to alternate gates of shift registers 18,20, the signals are shifted by means of clock driving pulses $\phi 1$, $\phi 2$ serially along registers 18,20 (i.e. from left to right in FIG. 1) to output gate 28. (The example cited here presumes the application of conventional two-phase CCD shift register techniques.) Inasmuch as alternating phase gates 23 of registers 18,20 only carry a photosensor derived signal, only one signal per clock pulse $\phi 1$, $\phi 2$ is input to gate 28. From gate 28 the serial stream of signals are sequentially sensed by holding diode 30 after periodic reset of the diode by clock pulse $\phi$. The sequence of signals then proceeds to CCD output amplifier section 31 and output line 32.

As alluded to earlier, the prior art designs utilize at least two shift registers, thereby increasing fabrication complexity and leading to the possibility of internal differences in signal level arising from differences within the shift registers. To obviate the aforedescribed problems, there is provided in accordance with this invention, a photosensitive array employing a single or one-sided shift register.

Figure 3:
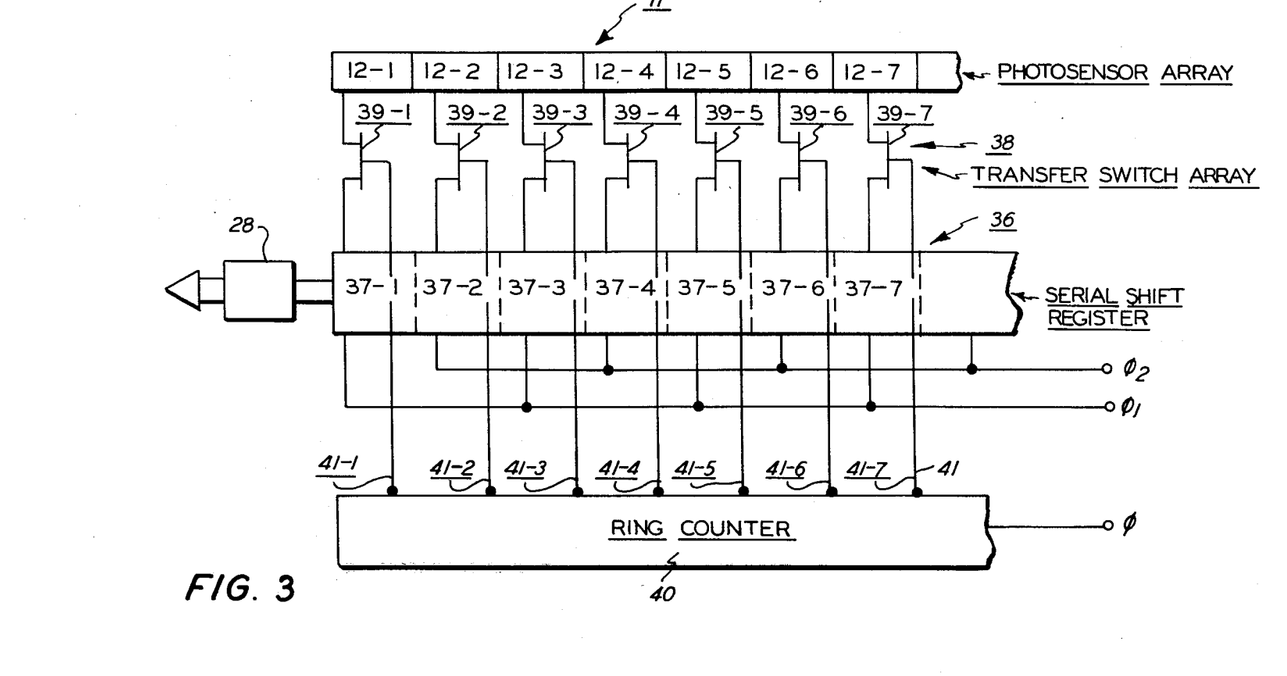
FIG. 3 is a schematic view of the improved self-scanned photosensitive array of the present invention.
Figure 4:
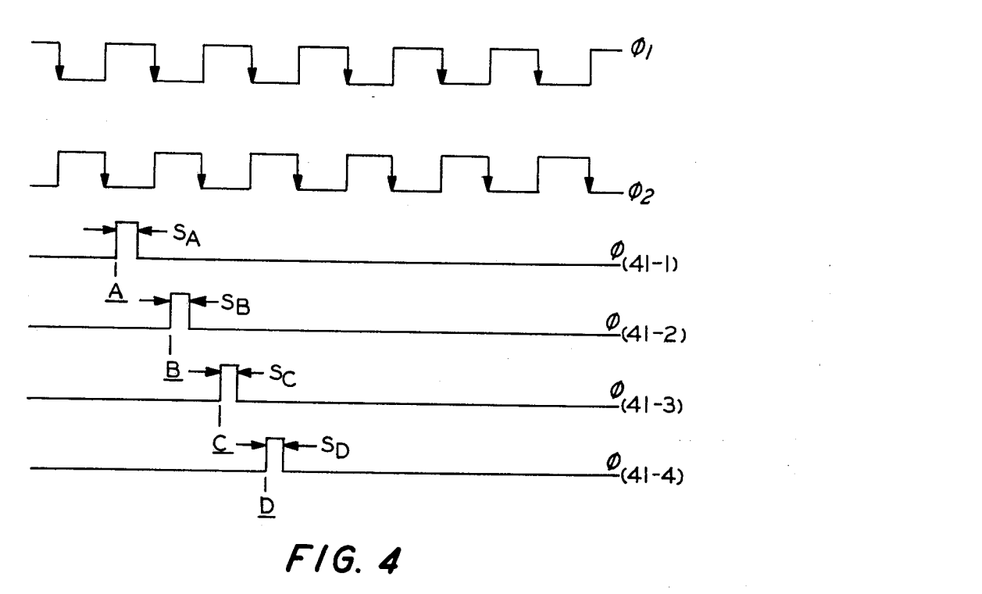
FIG. 4 is a timing chart illustrating the operational sequence of the array shown in FIG. 3.
Figure 5:
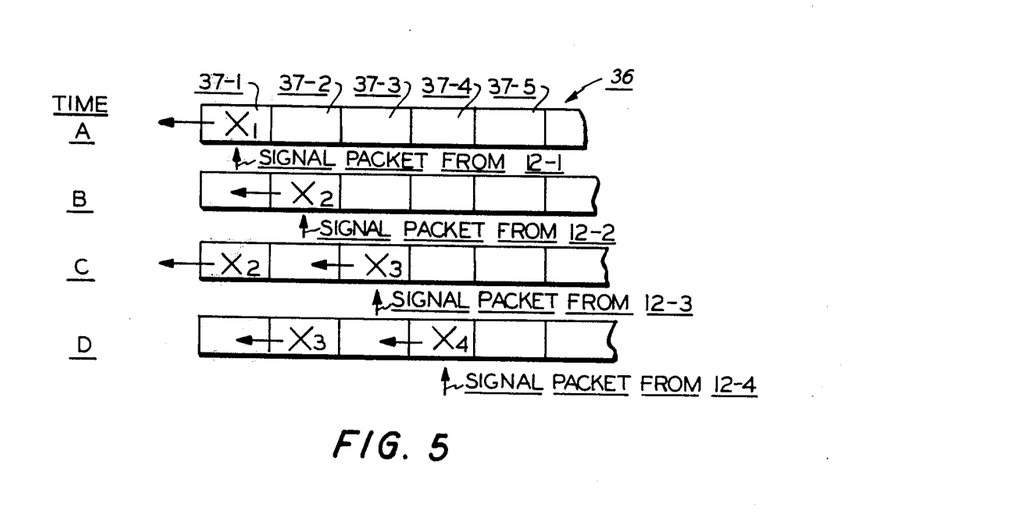
FIG. 5 is a schematic view showing various operational stages of the array shown in FIG. 3.

Referring to FIGS. 3–5 where like numbers refer to like parts, photosensor array 11 thereshown utilizes a single two phase shift register 36. The number of phase gates 37 in shift register 36 equals the number of photosensors 12 that comprise the array 11. A switch array 38 which may for example, be composed of MOS-FET type switches 39, couple each photosensor 12 of array 11 to a phase gate 37 of shift register 36. Ring counter 40, having a succession of outputs equal to the number of switches 39 provides sequential control over the transfer of the signal packets from photosensors 12 to the phase gates 37 of shift register 36. Leads 41 couple the successive output gates of ring counter 40 with switches 39. Clock drive pulses $\phi 1$, $\phi 2$ are provided to alternate phase gates of shift register 36. In the example shown, clock pulse $\phi 1$ drives the odd numbered phase gates 37-1, 37-3, etc. of shift register 36, while clock pulses $\phi 2$ drives the remaining or even numbered phase gates 37-2, 37-4, etc. of shift register 36.

In operation, enabling signals from ring counter 40 enable switches 39 of switch array 38 in succession to transfer the signal packets from photosensors 12 to the shift register phase gate 37 associated therewith. Timing of the transfer enabling signal from ring counter 40 is chosen to provide, in the example shown, a phase delay equal to each one-half cycle of clock pulses $\phi 1$, $\phi 2$. In the arrangement shown, ring counter 40 counts to the right as shown in FIG. 3 to sequentially dump a signal packet from each successive photosensor 12 into the phase gate 37 of shift register 36 associated therewith. Following this and before the next enabling pulse from ring counter 40, the receiving shift register phase gate is clocked to the left one position by either clock drive signal $\phi 1$ or $\phi 2$. Effectively therefore, the frequency of ring counter 40 is twice that of clock signals $\phi 1, \phi 2$. As a result, the signal packets from photosensors 12 are loaded into shift register 36 in proper sequence with the required separation of at least one shift register phase gate maintained between signals.

Referring particularly to FIGS. 4 and 5, the operational sequence for the two phase arrangement illustrated in FIG. 3 is thereshown. At time A, a signal (SA) from ring counter 40 through lead 41-1 to switch 39-1 enables the switch array gate to dump the signal packet from photosensor 12-1 into the first phase gate 37-1 of shift register 36. Clock pulses $\phi 1, \phi 2$ shift the signal in shift register phase gate 37-1 to output gate 28 where it may, for example, be applied to an output holding diode 30, as shown in FIG. 1, and further processed by the diode reset and output amplifier in conventional fashion. Shift register 36 is therefore empty at that instant. On the next succeeding cycle, at time B, a signal (SB) from lead 41-2 of ring counter 40 triggers switch 39-2 to dump the signal packet from photosensor 12-2 into the shift register gate 37-2. Clock signals $\phi 1, \phi 2$ shift the signal from shift register gate 37-2 to shift register gate 37-1. On the next cycle, at time C, a signal (SC) from lead 41-3 of ring counter 40 triggers switch 39-3 to transfer the signal packet from photosensor 12-3 to shift register phase gate 37-3. Signals therefore exist at that instant in both shift register phase gates 37-1 and 37-3. On the next clock pulse $\phi 2$, the signal in shift register phase gate 37-1 is output to lead 32 while the signal in phase gate 37-3 is shifted to the adjoining phase gate 37-2. On the following cycle, at time D, a signal (SD) from lead 41-4 of ring counter 40 triggers switch 39-4 to dump the signal packet from photosensor 12-4 into shift register phase gate 37-4. Signals therefore exist in shift register phase gates 37-2 and 37-4 at that instant. On the next shift register clock pulse $\phi 2$, the signals resident in shift register phase gates 37-2 and 37-4 are shifted sideways to the next adjoining gate 37-1 and 37-3 respectively.

The aforedescribed process continues until all of the photosensors 12 of array 11 are emptied into the phase gates of shift register 36. At that instant, every other phase gate of shift register 36 carries a signal. Thereafter, ring counter 40 is disabled and the signals in the shift register phase gates 37 are successively clocked out of shift register 36 to output gate 28. Following clocking out of the last signal from shift register 36, the process is repeated for the next line of data.

The aforedescribed two phase arrangement requires only one half the number of shift register phase gates as required heretofore while still preserving the minimal requirement for two-phase clocked registers of at least two shift register phase gates for each photosensor signal packet.

While a two phase arrangement has been described, additional phases, i.e. three phase, four phase etc. may be contemplated. In that circumstance, the number of shift register phase gates required would be, in the case of a three phase system, one third of that required heretofore, with a conventional photosensitive array or in the case of a four phase system, one fourth of that required heretofore.

Figure 6:
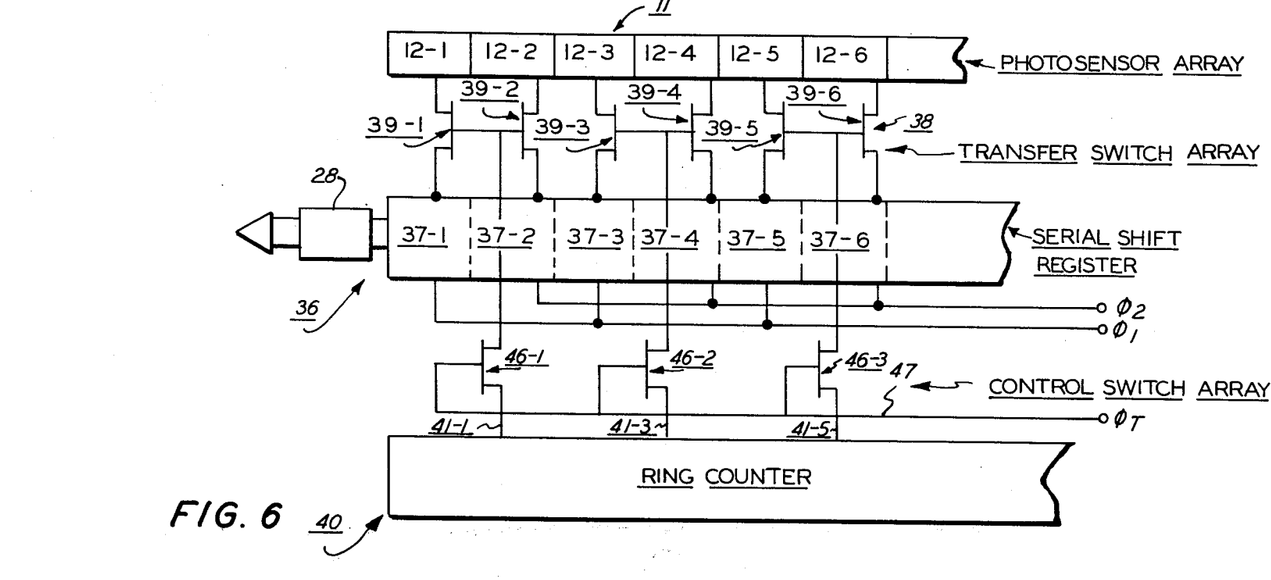
FIG. 6 is a schematic view of an alternate array constructed in accordance with the principles of the present invention.
Figure 7:
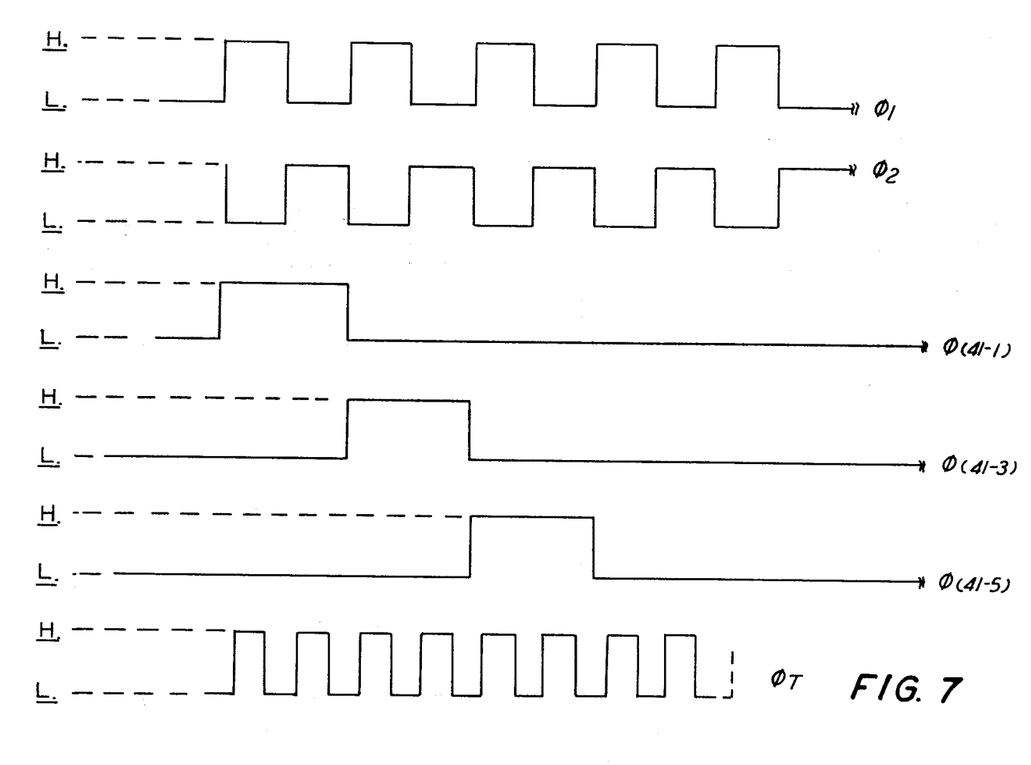
FIG. 7 is a timing chart illustrating the operational sequence of the array shown in FIG. 6.

Referring now to FIGS. 6 and 7, wherein like numbers refer to like parts, there is provided an arrangement to reduce the density of components of ring counter 40. In this embodiment, each output lead 41 of ring counter 40 controls two transfer switches, i.e. 39-1 and 39-2; 39-3 and 39-4; etc. thereby reducing the number of output gates of ring counter 40 by one half. A control switch 46 is provided in each ring counter output lead 41. Switches 46 are periodically enabled by a sequential transfer pulse $\phi_T$ applied through clock lead 47. The frequency of clock pulses $\phi_T$ in lead 47 is twice that of shift register driving pulses $\phi 1$, $\phi 2$.

In describing operation of the FIGS. 6-7 embodiment, it will be understood that adjoining shift register phase gates carry opposite potentials (designated herein as H,L). In operation, a trigger signal is output by ring counter 40 for a duration equal to one full cycle of shift register clock pulses $\phi 1$, $\phi 2$ as shown in FIG. 7. During the interval when lead 41-1 of ring counter 40 is high, the two clock pulses $\phi_T$ cause two corresponding enabling pulses to be transmitted through control switch 46-1 to the common gates of switching transistors 39-1 and 39-2. During the first of these two enabling pulses shift register gate 37-1 is in state H while shift register gate 37-2 is in state L. The transfer of the signal packet from photosensor 12-1 to shift register gate 37-1 is therefore triggered by the coincidence of the enabling pulse on switch 39-1 and the H state of shift register gate 37-1. Although the first enabling pulse is also present on switch 39-2, the connected shift register gate 37-2 is in state L, preventing transfer of any signal packet to this gate. During the second of the above described enabling pulses on the common gates of transfer switches 39-1 and 39-2, shift register gate 37-1 is low (L) and shift register gate 37-2 is high (H). Under these conditions the signal packet is transferred from photosensor 12-2 to shift register gate 37-2.

Subsequent pairs of photosensor signal packets, e.g., 12-3 and 12-4, 12-5 and 12-6, etc., are transferred into their corresponding shift register gates, e.g., 37-3 and 37-4, 37-5 and 37-6, etc., respectively. Each transfer is triggered by the coincidence of three events—a high (H) on one of the output leads 41 of ring counter 40, a high (H) on the trigger pulse line $\phi_T$, and a high (H) on the selected shift register gate. It can be seen from the timing diagram of FIG. 7 that such coincidences occur for only one unique photosensor-shift register pair at any instant in time, and that the coincidences occur in the proper sequence to transfer the photosensor signal packets into the shift register 37 as required for normal two phase shift register operation.

Clock lines $\phi_1$, and $\phi_2$ continue to cause right-to-left (as in FIG. 6) signal shifting of the signal packets so that the signals are transported to the output gate 28 in exactly the fashion described previously in FIG. 5. The pulses from the ring counter 40 and the trigger line $\phi_T$ terminate for one readout cycle after the last photosensor signal packet has been transferred to the last shift register gate. The clock lines $\phi_1$ and $\phi_2$ continue to operate until the last signal packet has been completely shifted out of the shift register into output gate 28, after which a new readout cycle may begin, starting with photosensor 12-1. As in the prior example, the signal at output gate 28 may be detected and amplified by any one of several conventional techniques employed in CCD imagers; e.g., that one disclosed in FIG. 1 showing prior art.

The two phase arrangement shown in FIG. 6 reduces density of ring counter 40 by one half. Additional phases, i.e. three phase, four phase, etc. effect further reductions in the density of ring counter 40 by factors of one third, one fourth, etc. respectively. As a further embodiment, control switches 46 may be discarded and the output of leads 41 of ring counter 40 coupled directly to the common gate junctions of transfer switches 39. In that circumstance, coincidence of the phase gate high potential level (H) with a trigger signal from ring counter 40 is relied on for transfer of the signal packet from the photosensors 12 comprising array 11 to the shift register phase gates.

While a ring counter has been described, other signal generating devices such as a CCD transfer register with the same number of output gates as the previously described ring counter may instead be contemplated. In that circumstance, a single pulse is loaded into the CCD transfer register and shifted in the same direction and at the same speed as in the previously described ring counter. Each output lead of the CCD transfer register includes a floating gate to couple the local potential under the new CCD counter register gates to the appropriate switch 39 of switch array 38.

While only one photosensor per transfer gate has been illustrated, additional photosensors per transfer gate may be contemplated. In this instance one transfer switch 39 per photosensor 12 is required and the ring counter output sequence must be logically adjusted to maintain the proper signal packet separation in the serial shift register 37.

It will be understood that the present invention enhances fabrication of compact multi-array units through the ability to place the photosensor arrays 12 in abutting face-to-face disposition along a contiguous line. In this circumstance, the centers of the photosensors of one array are offset relative to the centers of the photosensors of the second array. A preferable offset would be equal to $\frac{1}{2}$ the center-to-center distance of the photosensors in any one array.

While the invention has been described with reference to the structure disclosed, it is not confined to the details set forth, but is intended to cover such modifications or changes as may come within the scope of the following claims:

What is claimed is:

1. A self scanned photosensitive device comprising:
   (a) an array of photosensors;
   (b) a shift register having a plurality of phase gates for receiving signals from said photosensors individually;
   (c) an array of transfer switches for coupling said photosensors with individual ones of said shift register phase gates to enable signals from said photosensors to be transferred to said shift register phase gates;
   (d) counter means for triggering said transfer switches of said switch array in sequence; and
   (e) clock means for indexing said shift register to shift signals serially along said shift register from one phase gate to the next, said clock means having a frequency relative to that of said counter means to provide a number of adjoining shift register phase gates equal to the number of phases in said clock means for each photosensor signal.

2. The device according to claim 1 in which said counter means comprises a ring counter.

3. The device according to claim 1 in which said counter means comprises a charge coupled device.

4. The device according to claim 1 in which said shift register is adapted for three phase clock signals.

5. The device according to claim 1 in which said shift register is adapted for four phase clock signals.

6. The device according to claim 1 in which said counter means includes a succession of output stages;
   a control lead coupling each of said counter means output stages to successive pairs of transfer switches in said transfer switch array;
   a control switch in each of said control leads; and
   a clock transfer pulse signal for periodically enabling said control switches to conduct a trigger signal from said counter means to said transfer switch pairs whereby to trigger said transfer switches in accordance with the potentials of said shift register phase gates,
   the frequency of said clock transfer pulse signal being twice the frequency at which said clock means indexes said shift register.

7. The device according to any of claims 1, 2, 3, 4, 5, or 6 in which said device is disposed on a unitary semiconductor substrate.

8. The device according to claim 7 including at least two of said devices on said substrate, the photosensor array of one of said devices being disposed in face-to-face relationship with the photosensor array of the other of said devices, the photosensor array of said one device being offset laterally relative to the photosensor array of said other device.

9. The device according to claim 8 in which the photosensor array of said one device is offset laterally from the photosensor array of said other device by a distance equal to one-half the center-to-center distance between photosensors in said photosensor arrays.

10. An improved self scanned photosensitive array comprising:

(a) an array of photosensors;
(b) a two phase shift register having a plurality of phase gates for receiving signals from said photosensors individually;
(c) an array of switches for coupling said photosensors with individual ones of said shift register phase gates to enable signals from said photosensors to be transferred to said shift register phase gates;
(d) counter means for triggering switches of said switch array in sequence; and
(e) clock means for indexing said shift register to shift signals serially along said shift register from one phase gate to the next, said clock means having a frequency one half that of said counter means to provide two adjoining shift register phase gates for each photosensor signal.

11. The method of operating a self scanned photosensitive array having plural photosensors, a multiple gate shift register for receiving signals produced by said photosensors, and a transfer switch array for coupling photosensors to said shift register gates, the steps comprising:

(a) sensing and integrating a sequence of signals in the photosensor array proportional to the irradiance pattern incident on said array;
(b) sending a trigger pulse to each of said transfer gates in succession to transfer signals from said photosensors to said shift register gates;
(c) clocking alternate odd and even shift register gates between said transfer gate trigger pulses to step signals linearly along said shift register through said shift register gates to maintain the required spacing of analog signals as said signals progress toward said shift register output;
(d) terminating step b on triggering of the last one of said transfer switches;
(e) terminating step c when the last signal in said shift register is output from said shift register; and
(f) repeating steps a-e for each successive line sensed.

12. The device according to claim 7 including at least two of said devices on said substrate, the photosensor array of one of said devices being disposed in face-to-face relationship with the photosensor array of the other of said devices.

* * * * *